(12) United States Patent
Bagayatkar

(10) Patent No.: US 10,619,521 B2
(45) Date of Patent: Apr. 14, 2020

(54) WASTE HEAT RECOVERY POWER DRIVE

(71) Applicant: CUMMINS INC., Columbus, IN (US)

(72) Inventor: Nimish Bagayatkar, Carmel, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 16/063,974

(22) PCT Filed: Dec. 19, 2016

(86) PCT No.: PCT/US2016/067498
§ 371 (c)(1),
(2) Date: Jun. 19, 2018

(87) PCT Pub. No.: WO2017/112583
PCT Pub. Date: Jun. 29, 2017

(65) Prior Publication Data
US 2019/0178110 A1    Jun. 13, 2019

Related U.S. Application Data

(60) Provisional application No. 62/270,241, filed on Dec. 21, 2015, provisional application No. 62/294,058, filed on Feb. 11, 2016.

(51) Int. Cl.
*F01K 23/06*    (2006.01)
*F02G 5/04*    (2006.01)
(Continued)

(52) U.S. Cl.
CPC ............ *F01K 23/065* (2013.01); *F01D 15/02* (2013.01); *F01D 15/10* (2013.01); *F01D 15/12* (2013.01);
(Continued)

(58) Field of Classification Search
CPC ........ F01K 23/065; Y02T 10/166; F01N 5/02; F02G 5/00; F02G 5/02; F02G 5/04;
(Continued)

(56) References Cited

U.S. PATENT DOCUMENTS

| 4,145,888 A | 3/1979 | Roberts |
| 5,138,840 A | 8/1992 | Oguchi et al. |
| (Continued) | | |

FOREIGN PATENT DOCUMENTS

| CN | 1468347 | 1/2004 |
| CN | 102042119 | 5/2011 |
| (Continued) | | |

OTHER PUBLICATIONS

International Search Report from corresponding PCT Application No. PCT/US2016/067498, dated May 4, 2017, pp. 1-4.
(Continued)

*Primary Examiner* — Mark A Laurenzi
*Assistant Examiner* — Mickey H France
(74) *Attorney, Agent, or Firm* — Foley & Lardner LLP

(57) ABSTRACT

One embodiment relates to a waste heat recovery power drive system. The waste heat recovery power drive system includes a waste heat recovery system, which includes a heat exchanger operatively coupled to an engine so as to receive heat energy from the engine and transfer the heat energy to a working fluid. An expander is fluidly coupled to the heat exchanger to receive the working fluid from the heat exchanger. The expander is structured to convert heat energy from the working fluid to mechanical energy. A gearbox is operatively coupled to the expander. A front engine accessory drive includes a belt drive operatively coupling the gearbox to a crankshaft of the engine so as to transfer the mechanical energy from the gearbox to the crankshaft. A unitary assembly includes the front engine accessory drive, the gearbox, and the expander, and the unitary assembly is removable from the engine as a unitary component.

19 Claims, 16 Drawing Sheets

(51) Int. Cl.
*F02G 5/02* (2006.01)
*F02G 5/00* (2006.01)
*F01D 15/10* (2006.01)
*F01N 5/02* (2006.01)
*F01D 15/02* (2006.01)
*F01D 15/12* (2006.01)

(52) U.S. Cl.
CPC ................ *F01N 5/02* (2013.01); *F02G 5/00* (2013.01); *F02G 5/02* (2013.01); *F02G 5/04* (2013.01); *Y02T 10/166* (2013.01)

(58) Field of Classification Search
CPC .......... F01D 15/02; F01D 15/10; F01D 15/12; F02B 67/00; F02B 67/04; F02B 67/06
USPC .................................. 60/616, 618, 620, 624; 123/198 A–198 P, 198 R
See application file for complete search history.

(56) References Cited

U.S. PATENT DOCUMENTS

| | | | | |
|---|---|---|---|---|
| 6,244,239 B1* | 6/2001 | Sisco | ...................... | F02B 67/06 123/192.1 |
| 2002/0007636 A1* | 1/2002 | Hay | ...................... | F01K 23/065 60/618 |
| 2003/0115877 A1* | 6/2003 | Bara | ...................... | F01K 23/065 60/620 |
| 2008/0110171 A1 | 5/2008 | Schmeltz | | |
| 2010/0018203 A1* | 1/2010 | Richards | ................. | F01D 15/10 60/598 |
| 2011/0088397 A1* | 4/2011 | Mori | ...................... | F01K 23/065 60/661 |
| 2013/0219882 A1* | 8/2013 | Jensen | ...................... | F01N 5/02 60/604 |
| 2014/0144136 A1 | 5/2014 | Versteyhe | | |
| 2014/0352301 A1 | 12/2014 | Mueller | | |
| 2016/0230607 A1* | 8/2016 | Tanaka | ...................... | F02G 5/00 |

FOREIGN PATENT DOCUMENTS

| | | |
|---|---|---|
| CN | 102472121 | 5/2012 |
| CN | 102900520 | 1/2013 |
| CN | 103180554 | 6/2013 |
| JP | 2010-190186 | 9/2010 |
| JP | 5529070 | 6/2014 |
| WO | WO-2017/059402 | 4/2017 |

OTHER PUBLICATIONS

Written Opinion from corresponding PCT Application No. PCT/US2016/067498, dated May 4, 2017, pp. 1-7.

CN Office Action for CN Application No. 201680079358.5 dated Nov. 28, 2019, pp. 1-9.

* cited by examiner

WASTE HEAT RECOVERY POWER DRIVE

CROSS-REFERENCE TO RELATED APPLICATIONS

This application is the U.S. National Stage of PCT Application No. PCT/US2016/067498, filed Dec. 19, 2016, which claims the benefit of priority to U.S. Provisional Patent Application No. 62/270,241, filed Dec. 21, 2015, and U.S. Provisional Patent Application No. 62/294,058, filed Feb. 11, 2016, all of which are incorporated herein by reference in their entirety and for all purposes.

TECHNICAL FIELD

The present disclosure relates generally to the field of waste heat recovery ("WHR") systems for engines.

BACKGROUND

In operation, internal combustion engines discharge heat energy into the external environment through exhaust gas, engine cooling systems, charge air cooling systems, etc. The discharged heat energy that is not used to perform useful work is typically known as "waste heat." WHR systems capture a portion of the waste heat to perform useful work. Some WHR systems utilize a Rankine cycle ("RC"). The RC is a thermodynamic process in which heat is transferred to a working fluid in an RC circuit. The working fluid is pumped to a heat exchanger where it is vaporized. The vapor is passed through an expander and then through a condenser, where the vapor is condensed back to a fluid. The expanding working fluid vapor causes the expander to rotate, thereby converting the waste heat energy to mechanical energy. The mechanical energy may be transmitted to engine system components, such as a pump, a compressor, a generator, etc.

SUMMARY

One embodiment relates to a waste heat recovery power drive system. The waste heat recovery power drive system includes a waste heat recovery system. The waste heat recovery system comprises a heat exchanger operatively coupled to an engine so as to receive heat energy from the engine and transfer the heat energy to a working fluid. An expander is fluidly coupled to the heat exchanger to receive the working fluid from the heat exchanger. The expander is structured to convert heat energy from the working fluid to mechanical energy. A gearbox is operatively coupled to the expander. A front engine accessory drive comprises a belt drive operatively coupling the gearbox to a crankshaft of the engine so as to transfer the mechanical energy from the gearbox to the crankshaft of the engine. A unitary assembly includes the front engine accessory drive, the gearbox, and the expander, and the unitary assembly is removable from the engine as a unitary component.

Another embodiment relates to a belt drive system. The belt drive system includes a first pulley in rotational force exchanging communication with an internal combustion engine. A second pulley is in rotational force receiving communication with a waste heat recovery system. A third pulley is in rotational force providing communication with at least one auxiliary device. A first belt is configured to communicate rotational forces among the first pulley, the second pulley, and the third pulley. The first belt includes a first belt span configured to communicate rotational forces between the first pulley and the second pulley, and a second belt span configured to communicate rotational forces between the second pulley and the third pulley. A belt tensioner assembly includes a tensioner pulley coupled to the first belt. The tensioner pulley is configured to selectively apply pressure to the first belt at the second belt span. Pressure at the second belt span increases belt tension at the first belt span.

Another embodiment relates to a waste heat recovery power drive system. The waste heat recovery power drive system includes a waste heat recovery system. The waste heat recovery system comprises a heat exchanger operatively coupled to an engine so as to receive heat energy from the engine and transfer the heat energy to a working fluid. An expander is fluidly coupled to the heat exchanger to receive the working fluid from the heat exchanger. The expander is structured to convert heat energy from the working fluid to mechanical energy. A gearbox is operatively coupled to the expander. A front engine accessory drive comprises an input gear in meshed engagement with an output gear of the gearbox to operatively couple the gearbox to a crankshaft of the engine so as to transfer the mechanical energy from the gearbox to the crankshaft of the engine. A unitary assembly includes the front engine accessory drive, the gearbox, and the expander, and the unitary assembly is removable from the engine as a unitary component.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Referring generally to the figures, various embodiments relate to WHR power drive systems. According to various embodiments, WHR power drive systems may include several components or subsystems structured to optimize the amount of power recovered from waste heat of an engine. Multiple ones of the components or subsystems may be integrated into a single unitary assembly. The recovered power may be utilized in several ways, such as to supplement power to the crankshaft of the engine, to power accessories, to generate electrical energy, etc.

In an embodiment, a WHR power drive system includes a WHR system, a gearbox, and a front engine accessory drive ("FEAD"). In one example of this embodiment, an expander, a feed pump, and control valves of the WHR system, along with a gear train of the gearbox and the FEAD, are integrated into a single unitary assembly.

In some embodiments, a gearbox is structured to transfer energy from the WHR system to the crankshaft of the engine via a combination of hard gearing and a flexible damping belt drive so as to maximize operational efficiency of the WHR power drive system and to reduce vibration of the WHR power drive system. In some embodiments, the gearbox defines a cooling passage that is fluidly coupled to a working fluid circuit and structured to receive a working fluid from the working fluid circuit so as to cool the gearbox and oil disposed therein.

In some embodiments, an expander used for converting energy in an RC may be positioned so as to facilitate oil drainage from the WHR power drive system.

In some embodiments, a FEAD includes auxiliary engine systems and components that are driven by energy converted by the WHR system.

The WHR power drive system may be structured such that the entire system may easily be removed, and thus, by replacing the entire WHR power drive system, on-site repair and the associated downtime may be avoided. In addition, a size and a weight of the WHR power drive system may be minimized by the structure described in the present disclosure, thereby reducing material costs, improving efficiency (e.g., fuel economy), and enabling the system to be implemented in smaller spaces.

Figure 1A:
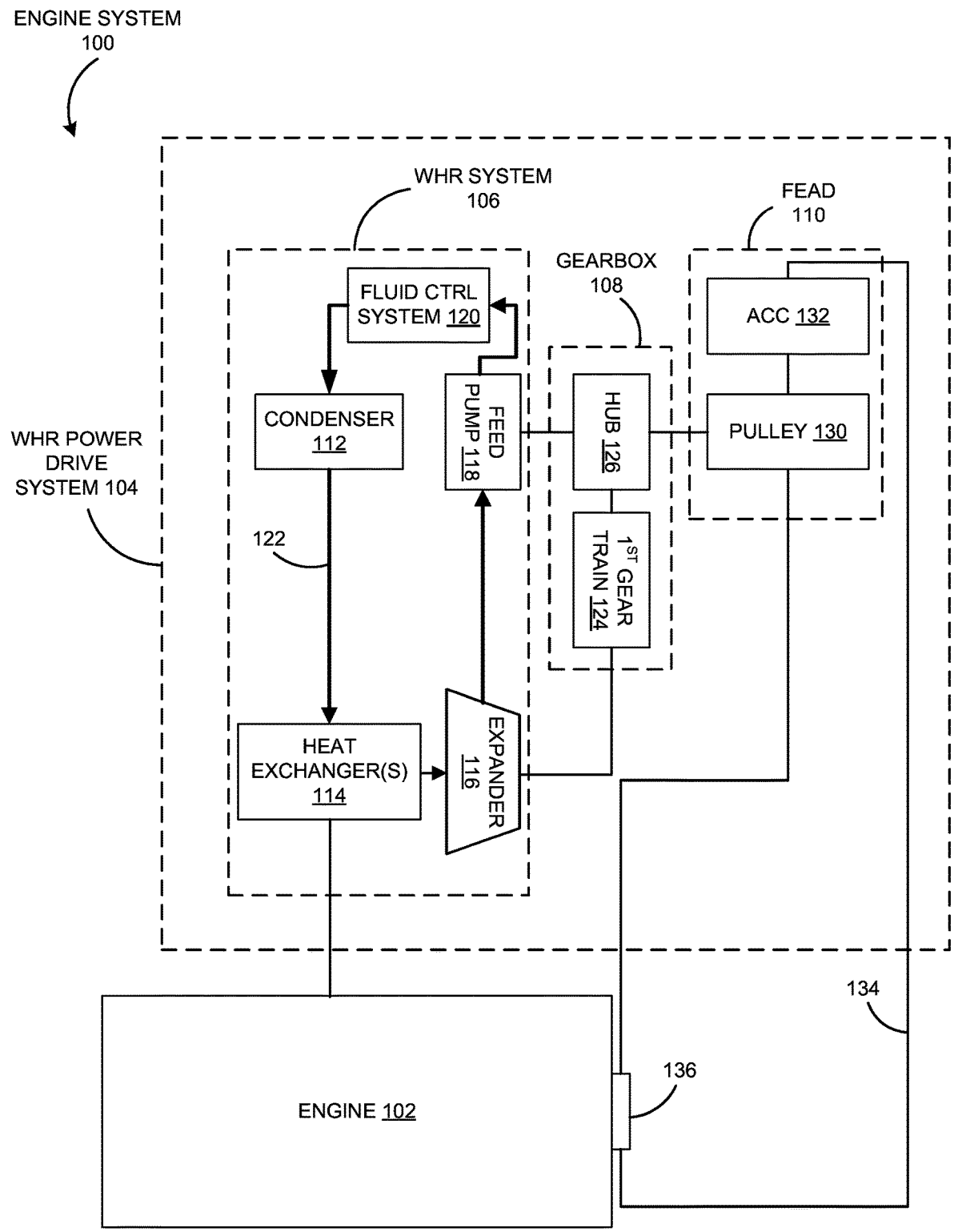
FIG. 1A is a block diagram of an engine system, including an engine and a WHR power drive system, according to an embodiment.

FIG. 1A is a block diagram of an engine system 100, including an engine 102 and a WHR power drive system 104, according to an embodiment. The engine 102 may be an internal combustion engine, such as a compression ignition or spark ignition engine, and may be fueled by various types of fuels, such as diesel, gasoline, compressed natural gas, ethanol, etc. The WHR power drive system 104 includes a WHR system 106, a gearbox 108, and an FEAD 110.

In general, the WHR system 106 is structured to convert waste heat produced by the engine 102 into useful energy, such as mechanical energy (e.g., which may be transferred to the crankshaft of the engine 102 or used to power components of the FEAD 110) and/or electrical energy (e.g., which may be stored in a battery for later use). The WHR system 106 includes a working fluid circuit 122 comprising a condenser 112, at least one boiler or heat exchanger 114, an expander 116, a feed pump 118, and a fluid control system 120, each being fluidly coupled via working fluid passages. The feed pump 118 is structured to pump a working fluid through the working fluid circuit 122, and the fluid control system 120 is structured to control fluid flow through the working fluid circuit 122.

In operation, the heat exchanger 114 operates as a heat exchanger to transfer heat energy from waste heat produced by the engine 102 to the working fluid in the working fluid circuit 122, so as to vaporize the working fluid. The vaporized working fluid is transferred from the heat exchanger 114 to the expander 116, which is positioned along the working fluid circuit 122 downstream of the heat exchanger 114. As the vaporized working fluid travels through the expander 116, the vapor expands, thereby driving a turbine of the expander 116. The vaporized working fluid flows from the expander 116 to the condenser 112, where the working fluid is cooled and condensed back to a liquid, and subsequently recycled through the working fluid circuit 122. According to various embodiments, the expander 116 may be a turbine expander, magnetic coupling expander, piston expander, or any other type of expander.

The gearbox 108 includes a first gear train 124 and a hub 126. The first gear train 124 and the hub 126 may be positioned at least partially within an enclosure (not shown), which may also house various other components of the WHR system 106, such as, for example, the condenser 112, feed pump 118, and the fluid control system 120. In addition, the enclosure may provide mounting surfaces for various components of the FEAD 110. The first gear train 124 operatively couples the expander 116 and the hub 126 so as to transfer torque from the expander 116 to the hub 126. The first gear train 124 may include one or more gears structured to reduce a rotational velocity of the hub 126 relative to that of the expander 116. The hub 126 is operatively coupled to one or both of the feed pump 118 of the WHR system 106, and a pulley 130 of the FEAD 110. Accordingly, energy recovered by the WHR system 106 via the expander 116 is utilized to drive one or both of the feed pump 118 of the WHR system 106 and the pulley 130 of the FEAD 110. In some embodiments, the gearbox 108 may operatively couple the expander 116 to the engine 102 (e.g., to the crankshaft of the engine 102) to transmit energy to the engine 102 via a direct gear-to-gear connection. For example, in some embodiments, the FEAD 110 includes an input gear in meshed engagement with an output gear of the gearbox 108 to operatively couple the gearbox 108 to a crankshaft of the engine 102 so as to transfer mechanical energy from the gearbox to the crankshaft of the engine 102. In some embodiments, the gearbox 108 may operatively couple the expander 116 to other components of the engine system 100, or components external to the engine system 100.

The FEAD 110 includes an accessory 132 operatively coupled to the pulley 130 via a belt 134. Although not shown in FIG. 1A, the FEAD 110 may include several pulleys 130 and several accessories 132. In some embodiments, one or more accessories 132 may be coupled to the gearbox 108 via a direct gear-to-gear connection. The accessories 132 may include, for example, an alternator, a water pump, a compressor, etc. The belt 134 may also be operatively coupled to a crankshaft 136 of the engine 102. Accordingly, energy recovered by the WHR system 106 may be transmitted back to the engine 102 via the FEAD 110. A system structured to transfer torque, comprising the belt 134 and one or more pulleys, can be referred to as a "belt drive." As will be appreciated, various belt drives can also include additional components, such as one or more belt tensioners.

Some embodiments utilize a combination of one or more belt drives and one or more direct gear-to-gear connections to operatively couple any combination of the engine 102, the WHR system 106, the gearbox 108 and the FEAD 110. In some embodiments, arrangements that utilize a combination of belt drives and geared connections may exhibit lower noise and vibration than other arrangements.

Figure 1B:
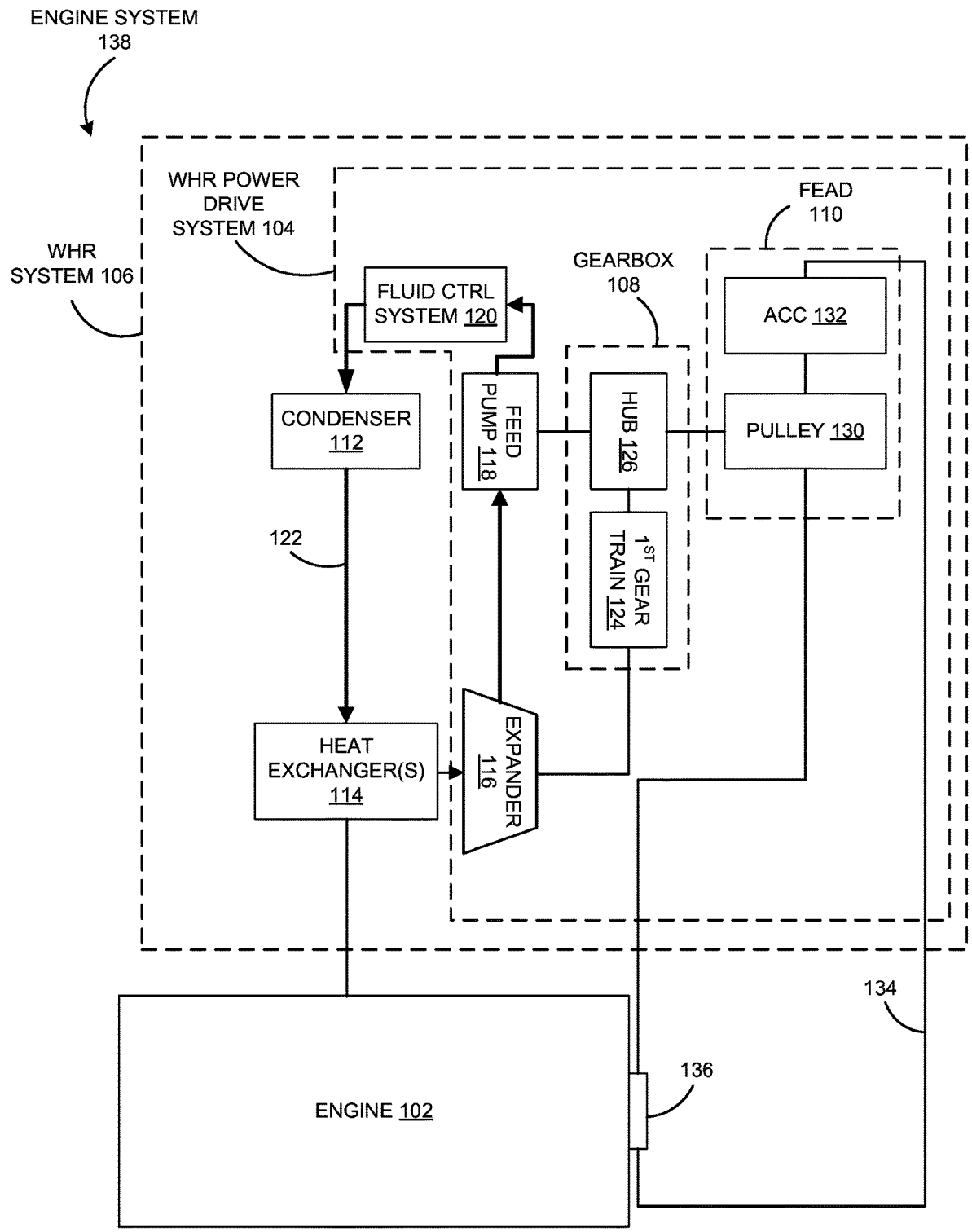
FIG. 1B is a block diagram of an engine system, including an engine and a WHR system, according to an embodiment.

FIG. 1B is a block diagram of an engine system 138, according to another embodiment. The engine system 138 is an alternative arrangement of the engine system 100 of FIG. 1A. As illustrated in FIG. 1B, the engine system 138 includes the engine 102 and the WHR system 106, The WHR system 106 includes the WHR power drive system 104, the gearbox 108, the FEAD 110, the condenser 112, and the heat exchanger 114. The WHR power drive system 104 includes the gearbox 108, the FEAD 110, the expander 116, the feed pump 118, and the fluid control system 120.

Figure 2:
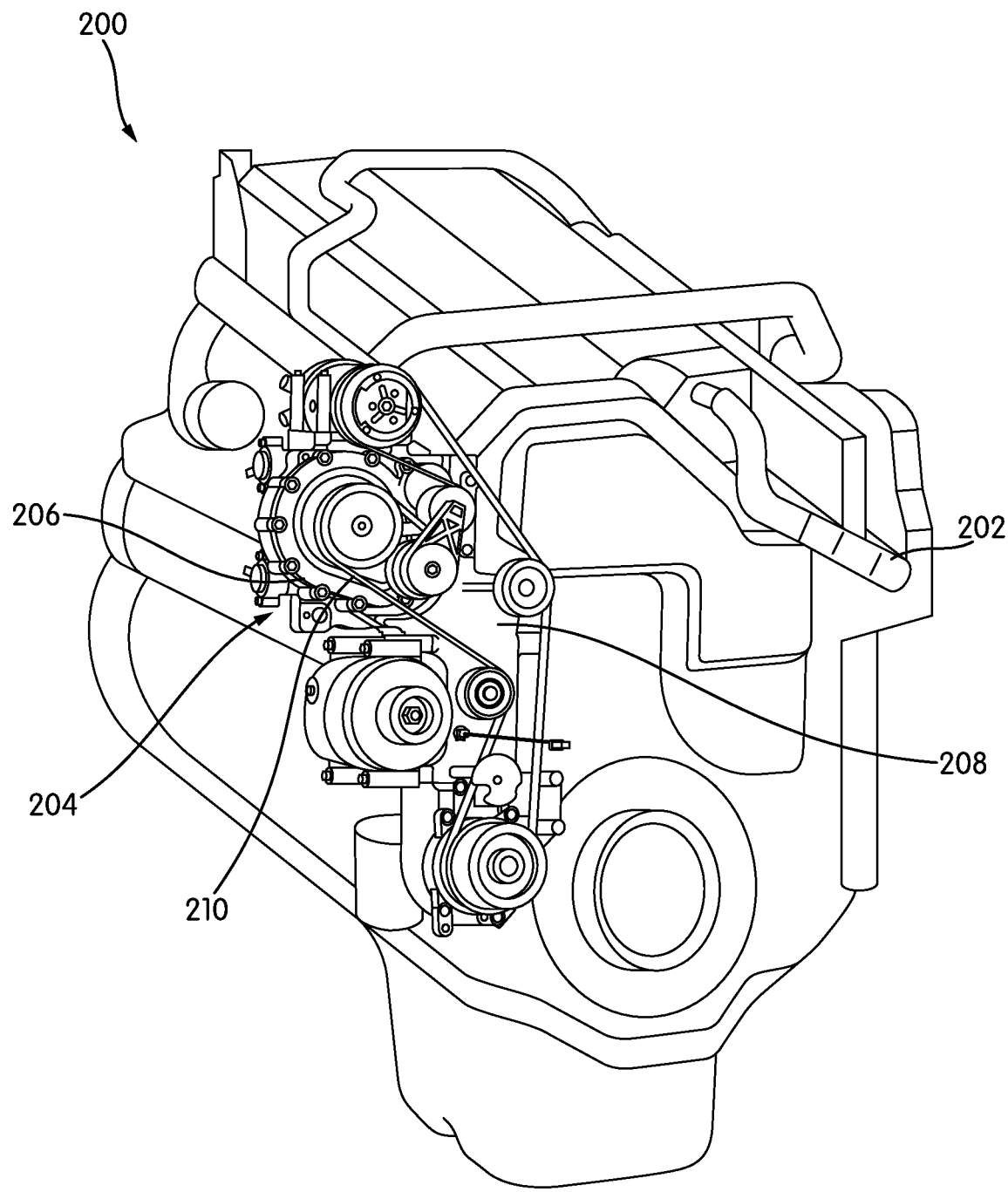
FIG. 2 is a perspective view illustration of an engine system, including an engine and a WHR power drive system, according to an embodiment.

FIG. 2 is a perspective view illustration of an engine system 200, including an engine 202 and a WHR power drive system 204, according to an embodiment. The WHR power drive system 204 may be similar to the WHR power drive system 104 of FIG. 1A. As illustrated in FIG. 2, the WHR power drive system 204 includes a WHR system 206, a gearbox 208, and an FEAD 210. In the embodiment illustrated in FIG. 2, the WHR power drive system 204 is structured such that some or all of the components of each of the WHR system 206, the gearbox 208, and the FEAD 210 are integrated into a single unitary assembly that is removable from the engine 202 as a single component.

Figure 3:
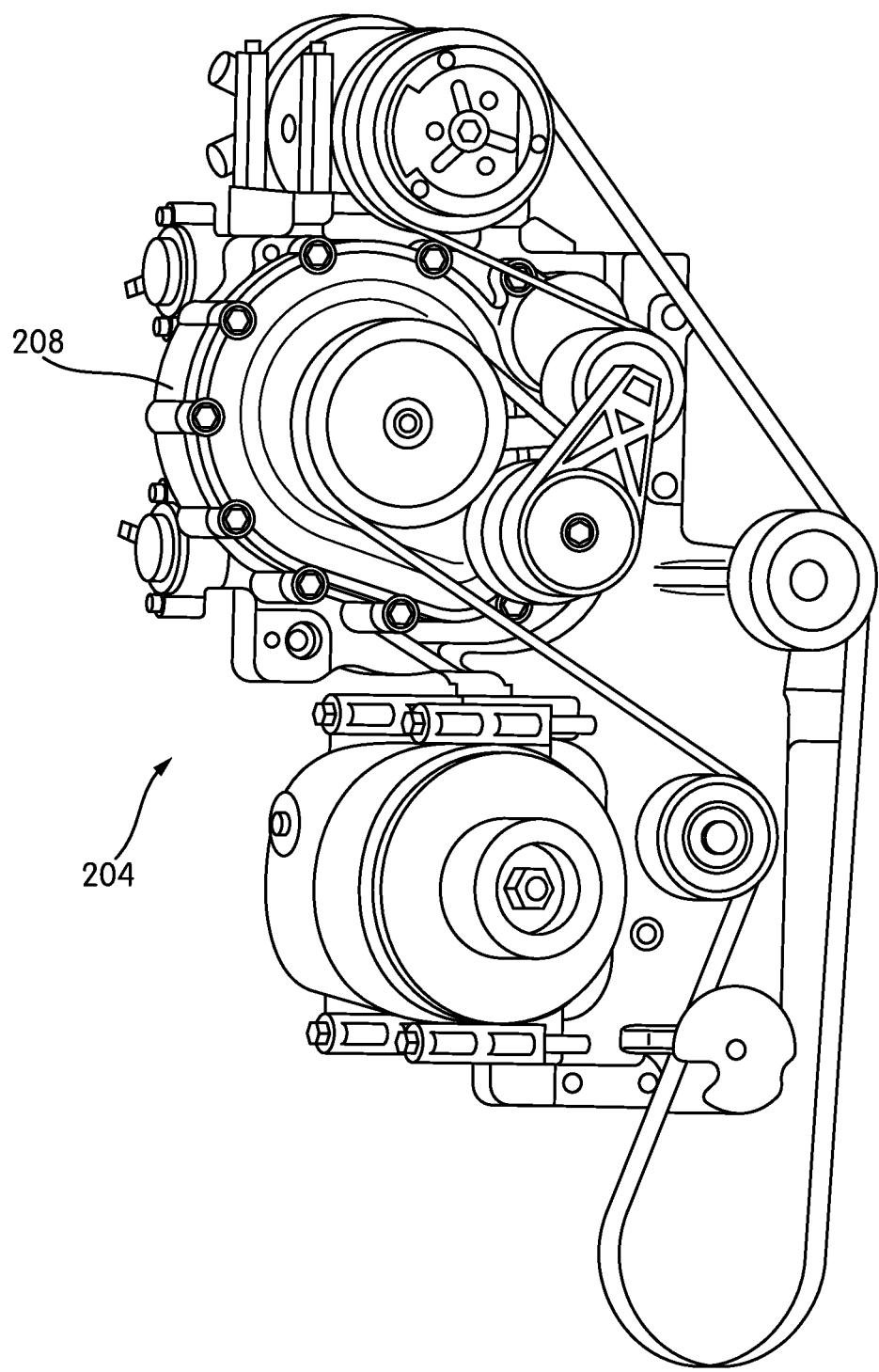
FIG. 3 is a perspective view illustration of the WHR power drive system of FIG. 2.
Figure 4:
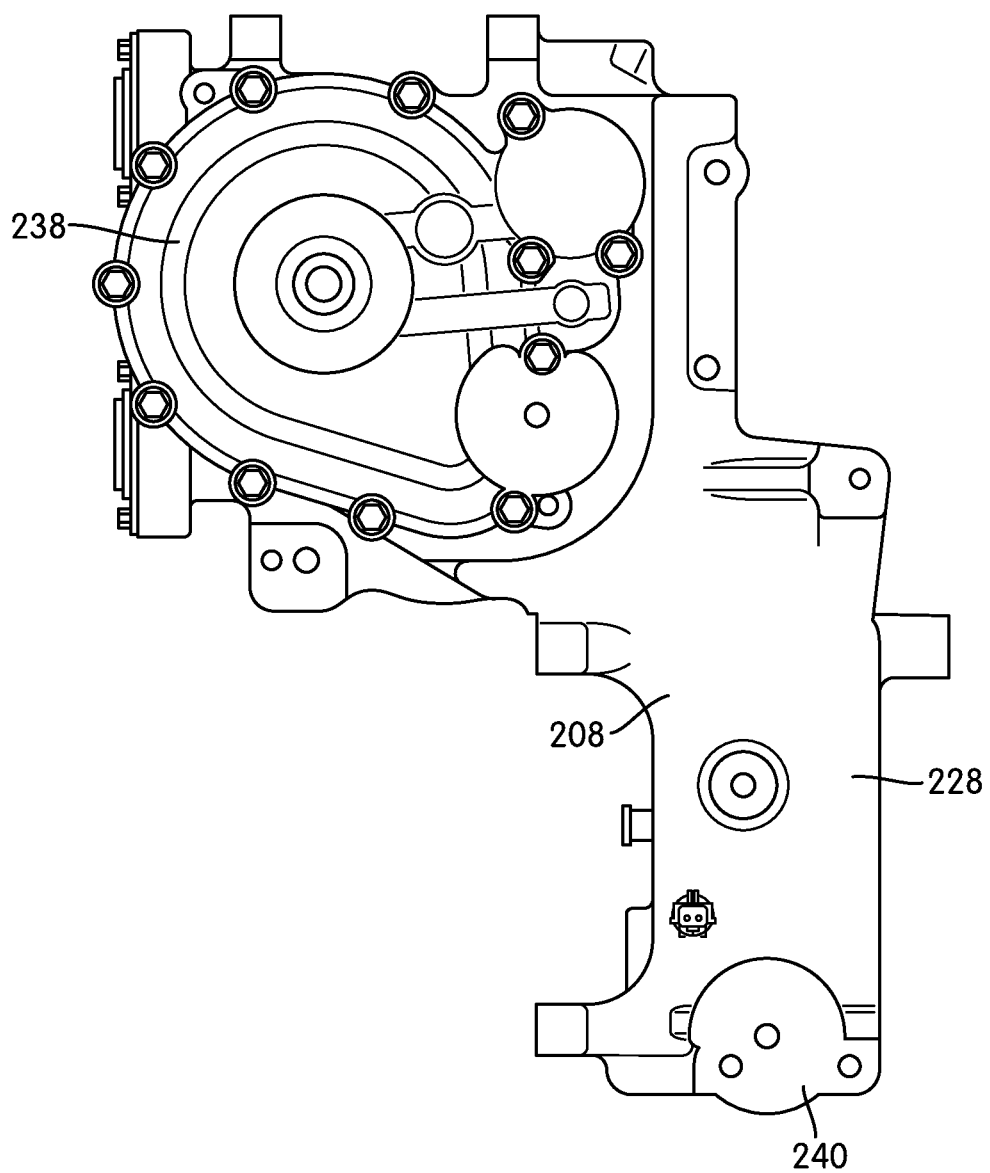
FIG. 4 is a front elevational view of the illustration of a gearbox of the WHR power drive system of FIG. 3.

FIG. 3 is a perspective view illustration of the WHR power drive system 204 of FIG. 2. In particular, the illustration of FIG. 3 is shown so as to emphasize the gearbox 208. FIG. 4 is a front elevational view of the illustration of the gearbox 208 of the WHR power drive system 204 of FIG. 3. In FIGS. 3 and 4, the WHR power drive system 204 includes an enclosure 228 that is shared by both the WHR system 206 (not shown) and the gearbox 208. The enclosure 228 is structured to enclose and protect various components of the WHR system 206 and the gearbox 208. The enclosure 228 includes an enclosure cover 238, which is removable to provide access to components of the WHR system 206 and the gearbox 208. The enclosure 228 also defines integral mounting features 240 (e.g., brackets or standoffs) for various components, including components of the FEAD 210. Accordingly, the enclosure 228 eliminates the need for separate mounting brackets for the FEAD 210 in the embodiment illustrated.

Figure 5:
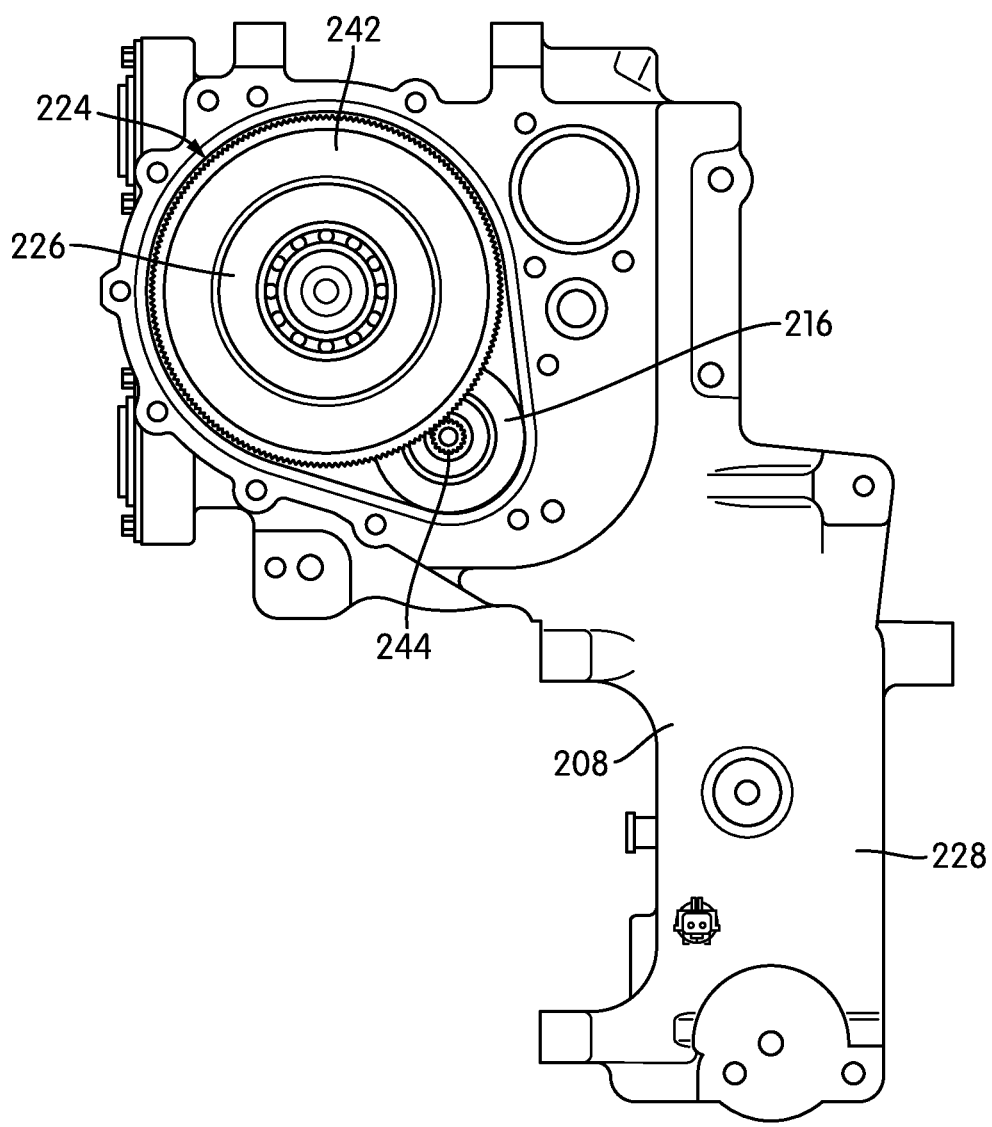
FIG. 5 is a front elevational view of the illustration of the gearbox of FIG. 4, with an enclosure cover omitted.

FIG. 5 is a front elevational view illustration of the gearbox 208 of FIG. 4. In FIG. 5, the enclosure cover 238 is omitted. As illustrated in the embodiment of FIG. 5, a hub 226 and a bull gear 242 of a first gear train 224 of the gearbox 208 are disposed within the enclosure 228. The bull gear 242 is operatively coupled to the hub 226. In embodiments, the bull gear 242 is fixedly coupled to the hub 226 such that the bull gear 242 does not rotate relative to the hub 226. For example, in one embodiment, the bull gear 242 is press-fit or keyed to the hub 226. The bull gear 242 is further operatively coupled (e.g., in meshed engagement) with a pinion 244 of an expander 216 of the WHR system 206. Accordingly, the bull gear 242 is structured to transmit torque from the expander 216 of the WHR system 206 to the hub 226. As shown in FIG. 5, the expander 216 is disposed at a vertically lower position on the gearbox 208 relative to the first gear train 224. In other words, an output shaft of the expander 216 is disposed at a vertically lower position on the gearbox 208 relative to central axes of each of the hub 226 and the bull gear 242 of the first gear train 224. In some embodiments, the output shaft of the expander 216 is disposed at a vertical position on the gearbox 208 in line with a lower half of the first gear train 224. The position of the expander 216 is described relative to an orientation of the gearbox 208 when installed on a vehicle. The position of the expander 216 as being vertically lower than the first gear train 224 is shown to reduce aerodynamic losses in operation.

Figure 6:
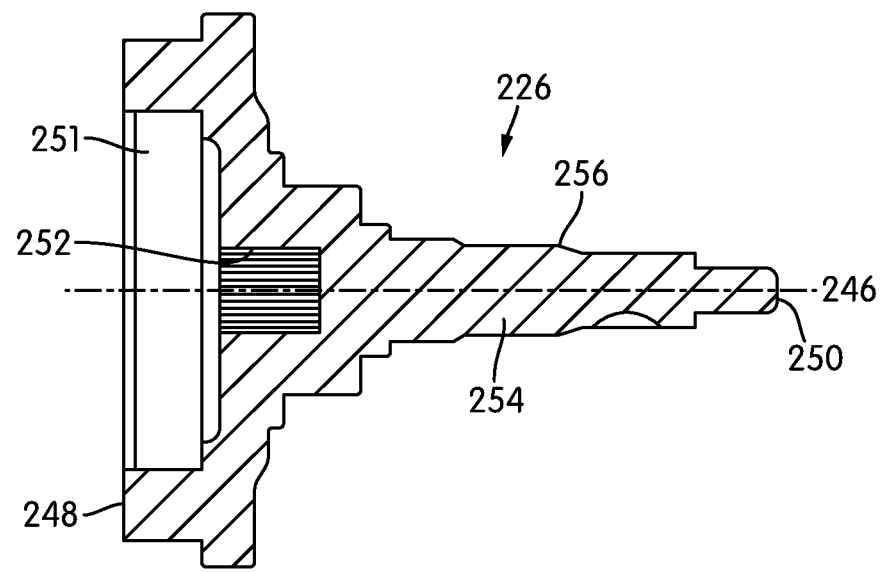
FIG. 6 is a side elevational view illustration of a hub of the gearbox of FIG. 5.

FIG. 6 is a side elevational view illustration of the hub 226 of the gearbox 208 of FIG. 5. The hub 226 supports the bull gear 242 and is structured to transmit torque from the WHR system 206 to a pulley (not shown) of the FEAD 210. The hub 226 extends along a longitudinal axis 246 from a first end 248 to a second end 250. The hub 226 defines a recess 251 proximate the first end 248. The recess 251 is structured to receive at least a portion of a feed pump (not shown) of the gearbox 208. The hub 226 further defines a female spline 252 (e.g., of an SAE spline coupling) extending further into the hub 226 from the recess 251 towards the second end 250. As will be appreciated, the female spline 252 is structured to receive a corresponding male spline of the feed pump. The hub 226 also includes a shaft 254 that extends along the longitudinal axis 246 to the second end 250. The shaft 254 defines several engagement features 256 structured to engage corresponding features of other components that are driven by the hub 226. For example, as will be appreciated, the hub 226 may be further structured to drive a lubrication ("lube") pump (not shown) of the gearbox 208, as well as a pulley (not shown) of the FEAD 210. The hub 226 is structured to be positioned at least partially within the enclosure 228. For example, in some embodiments, the shaft 254 extends through the enclosure 228. In some embodiments, the pulley is operatively coupled to the shaft 254 and positioned outside of the enclosure 228. Some embodiments further include a seal mechanism operatively coupled to the shaft. The seal mechanism is structured to prevent fluids from exiting the gearbox enclosure and to prevent atmospheric elements and debris from entering the gearbox enclosure.

Figure 7:
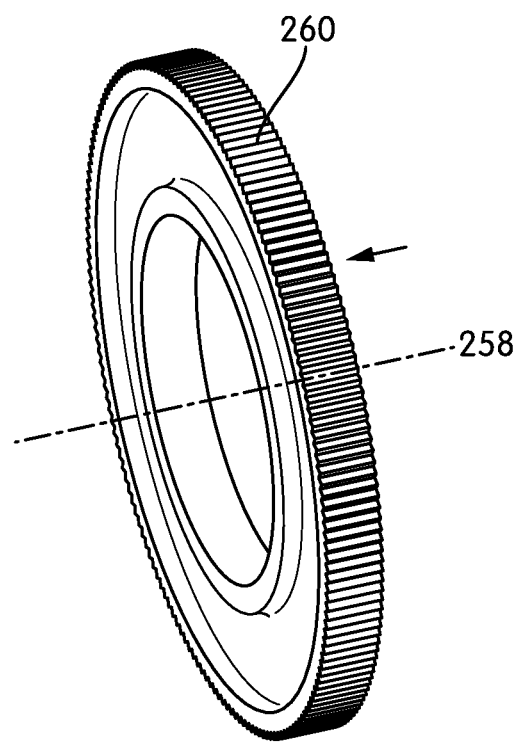
FIG. 7 is a perspective view illustration of a bull gear of the gearbox of FIG. 5.

FIG. 7 is a perspective view illustration of the bull gear 242 of the gearbox 208 of FIG. 5. The bull gear 242 defines a central axis 258 that, in operation, is coaxial with the longitudinal axis 246 of the hub 226. The bull gear 242 defines gear teeth 260 positioned about an outer peripheral surface of the bull gear 242. The gear teeth 260, along with gear teeth of the pinion 244 of the expander 216, define a gear ratio between the bull gear 242 and the pinion 244. In one embodiment, the gear ratio is greater than 10:1. In one embodiment, the gear ratio is 10.5:1.

Figure 8:
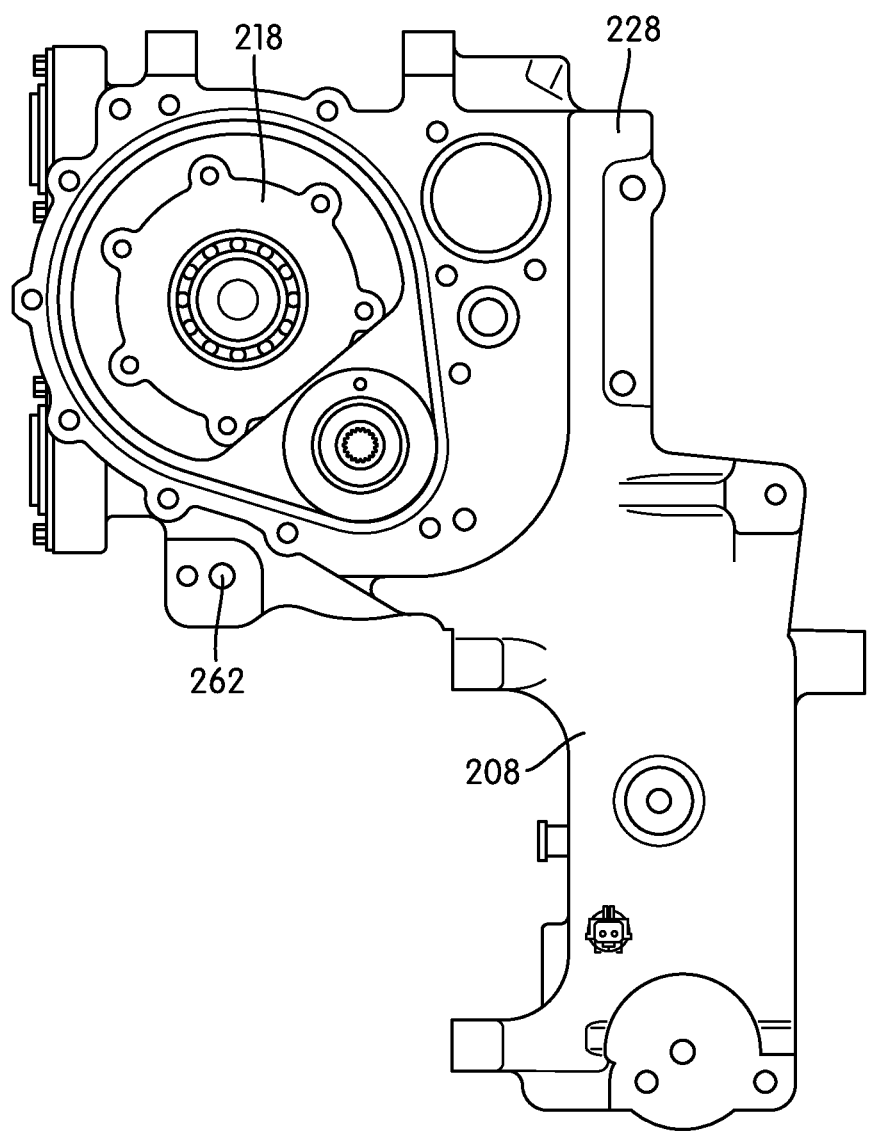
FIG. 8 is a front elevational view of the illustration of the gearbox of FIG. 4.

FIG. 8 is a front elevational view illustration of the gearbox 208 of FIG. 5, with the hub 226 and the bull gear 242 removed from the gearbox 208. As illustrated in FIG. 8, a feed pump 218 of the WHR system 206 is also disposed within the enclosure 228, adjacent (e.g., behind in the orientation shown) the hub 226 (not shown). The feed pump 218 is structured to circulate a working fluid (e.g., a refrigerant) through a working fluid circuit. The enclosure 228 defines an intake port 262 of the working fluid circuit.

Figure 9:
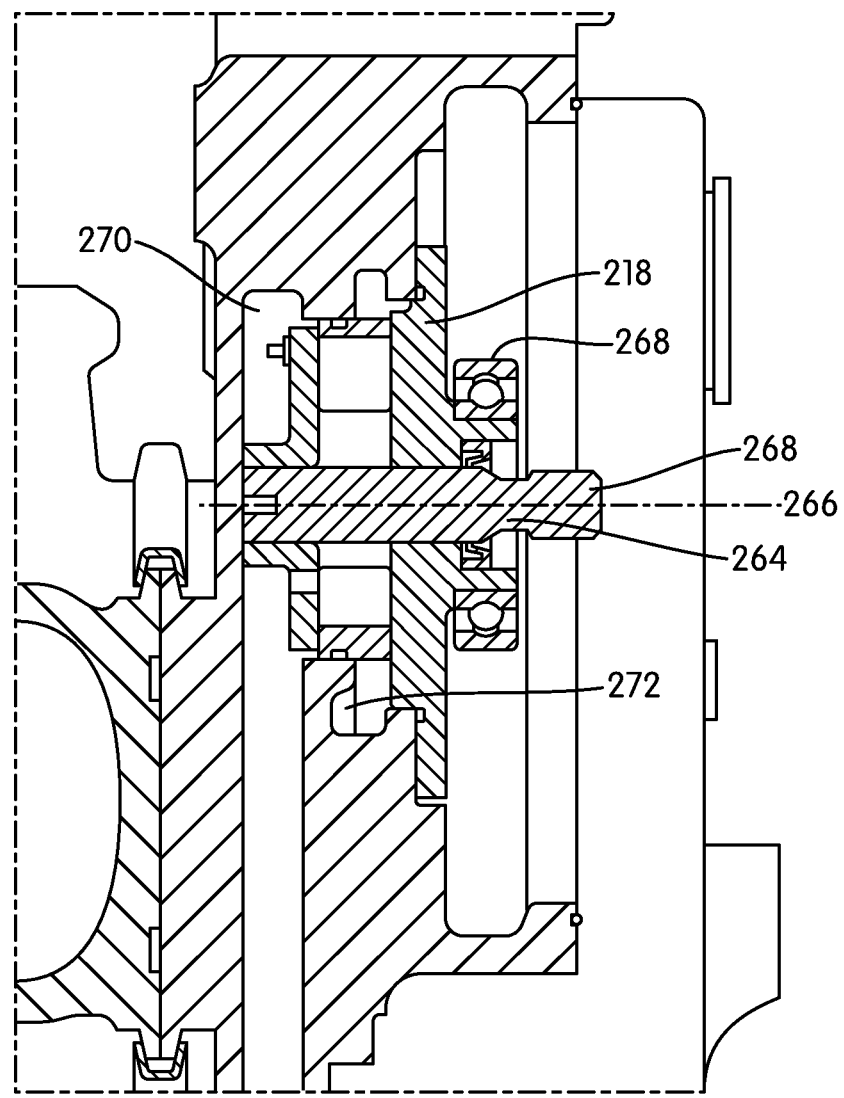
FIG. 9 is a cross-sectional side view illustration of the gearbox of FIG. 8.

FIG. 9 is a cross-sectional side view illustration of the gearbox 208 of FIG. 8. The feed pump 218 includes a shaft 264 extending along a longitudinal axis 266 of the feed pump 218. The longitudinal axis 266 of the feed pump 218 is coaxial with the longitudinal axis 246 of the hub 226 (FIG. 6) when assembled. The shaft 264 defines a male spline 268 structured to engage the female spline 252 of the hub 226. The enclosure 228 defines a suction cavity 270 and a discharge cavity 272, which form a portion of the working fluid circuit. The feed pump 218 is structured to draw working fluid from the suction cavity 270 and to discharge the working fluid into the discharge cavity 272.

Figure 10:
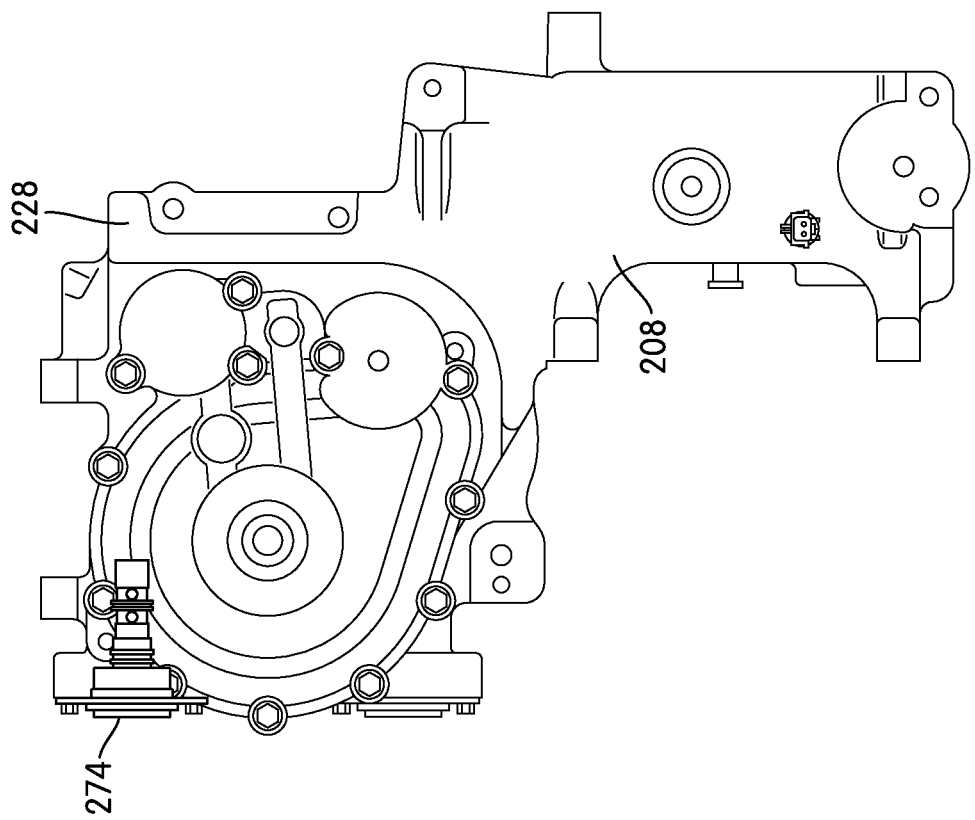
FIG. 10 is a front elevational view illustration emphasizing a flow control valve of the WHR power drive system of FIG. 2.

FIG. 10 is a front elevational view illustration emphasizing a flow control valve 274 of the WHR system 206 of FIG. 2. The flow control valve 274 is part of a fluid control system of the WHR system 206. The flow control valve 274 is removably coupled to the enclosure 228 of the gearbox 208. The flow control valve 274 controls flow of the working fluid through the working fluid circuit. In particular, the flow control valve 274 controls flow of the working fluid to a heat exchanger (not shown) of the WHR system 206. In some embodiments, the flow control valve 274 also controls flow of the working fluid from the working fluid circuit to other fluid circuits, such an exhaust gas recirculation ("EGR") fluid circuit.

Figure 11:
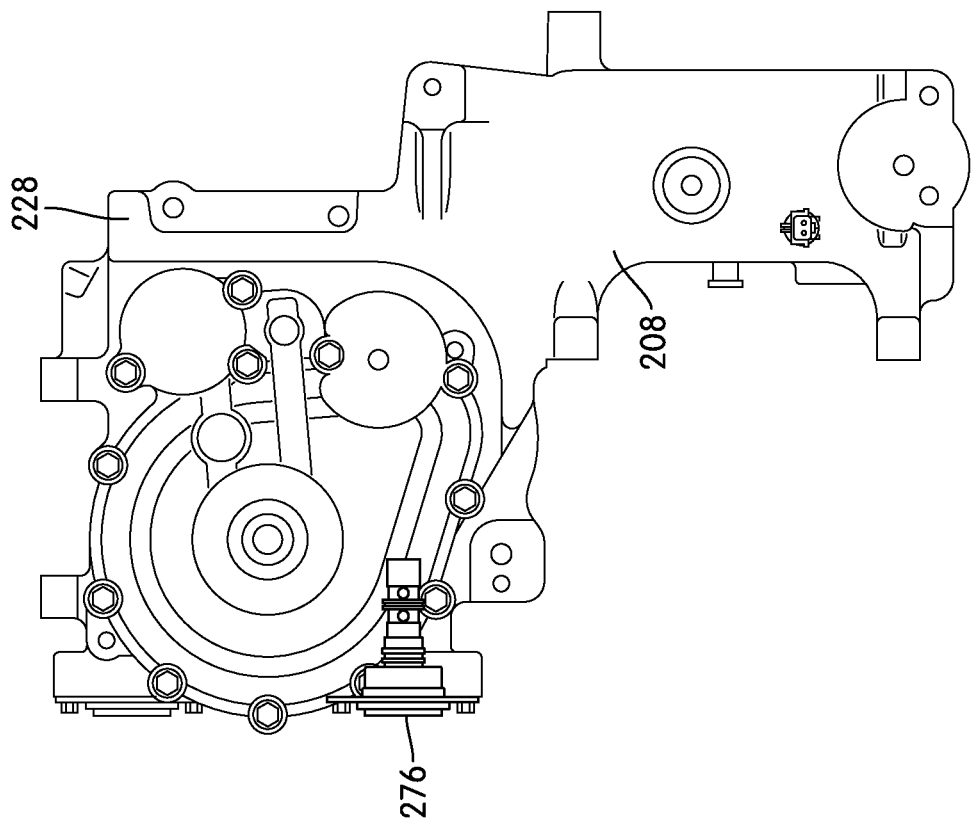
FIG. 11 is a front elevational view illustration emphasizing a bypass valve of the WHR power drive system of FIG. 2.

FIG. 11 is a front elevational view illustration emphasizing a bypass valve 276 of the WHR system 206 of FIG. 2. The bypass valve 276 is also part of the fluid control system of the WHR system 206. The bypass valve 276 is removably coupled to the enclosure 228 of the gearbox 208. The bypass valve 276 controls flow of the working fluid through the working fluid circuit by selectively bypassing flow of the working fluid to an inlet of the feed pump 218 so as to bypass the heat exchanger (not shown). In some embodiments, the bypass valve 276 is structured to selectively direct the working fluid from the working fluid circuit upstream of the heat exchanger to the working fluid circuit downstream of the expander so as to bypass each of the heat exchanger and the expander. In some embodiments, the bypassed working fluid is provided to the working fluid circuit upstream of the feed pump 218. In other embodiments, the bypassed working fluid is provided to the working fluid circuit upstream of the condenser (not shown). It should be understood that the fluid control system may include one or more fluid passages (e.g., tubes or lines) to selectively direct the working fluid as described.

Figure 12:
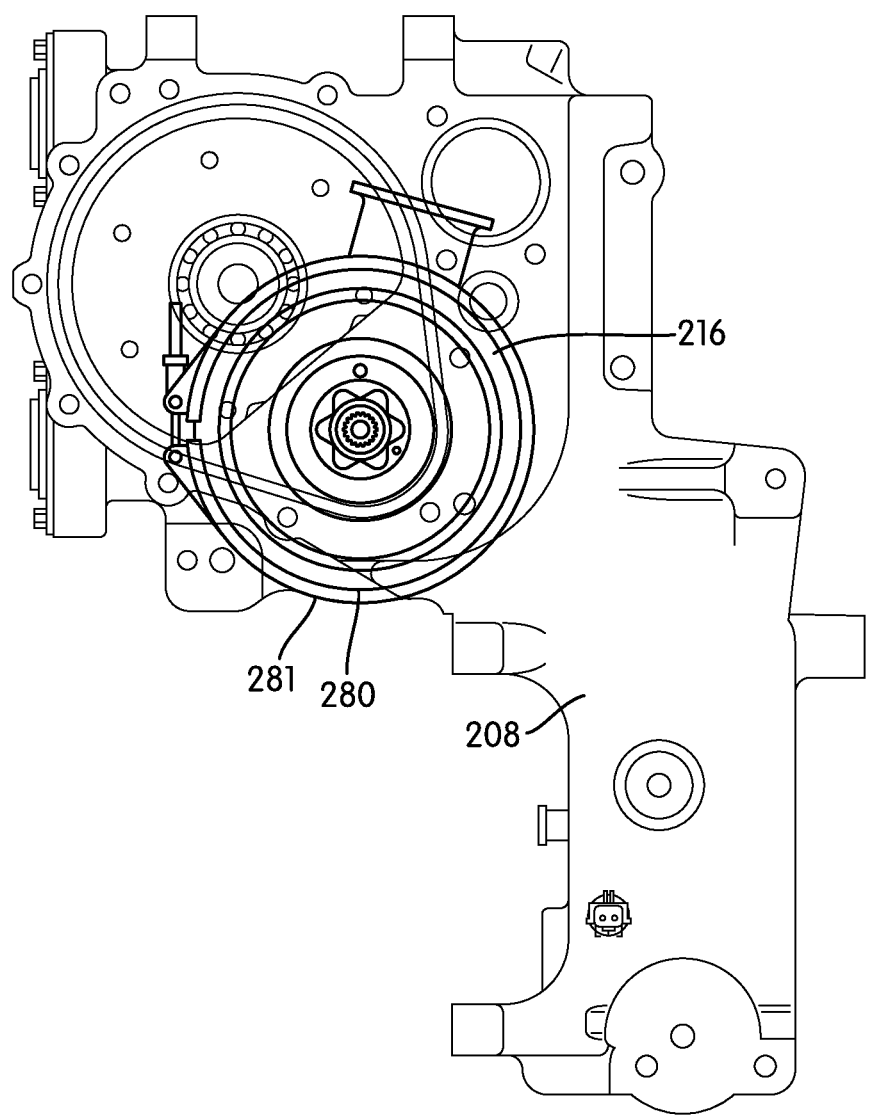
FIG. 12 is a front elevational view illustration emphasizing an expander of the WHR power drive system of FIG. 2.

FIG. 12 is a front elevational view illustration emphasizing the expander 216 of the WHR system 206 of FIG. 2 (see also FIG. 5). The expander 216 includes an oil drain 280 positioned on a lower surface 281 of the gearbox 208 to facilitate oil drainage from the system. In particular, the oil drain 280 is positioned on a surface that is not obstructed by other components, such that an operator may access the oil drain 280.

Figure 13:
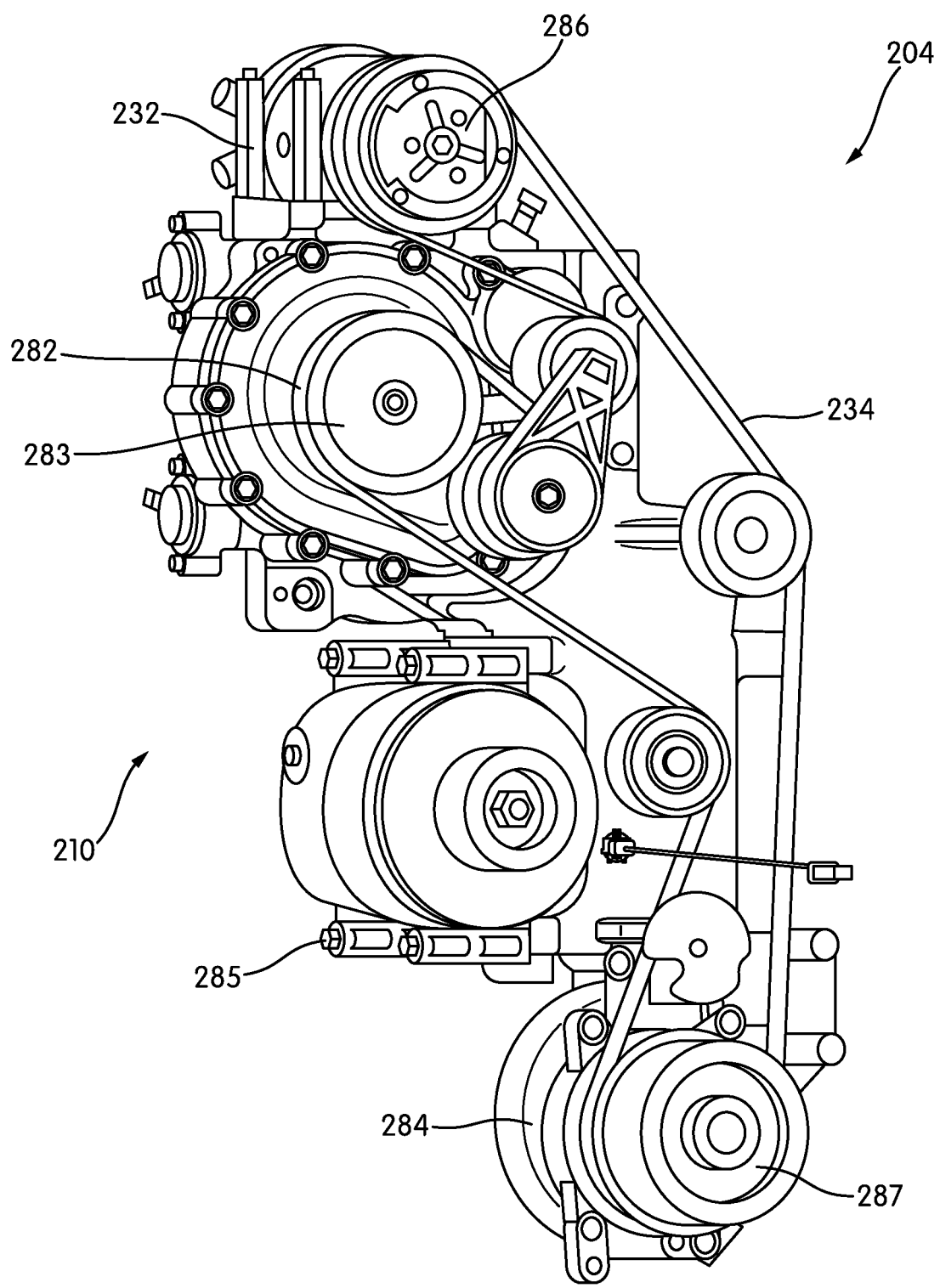
FIG. 13 is a perspective view illustration of the WHR power drive system of FIG. 2.

FIG. 13 is a perspective view illustration of the WHR power drive system 204 of FIG. 2. The FEAD 210 includes one or more accessories of the engine system 200 (FIG. 2), as well as driving components structured to transmit power to drive the accessories. For example, the driving components may include belt drives, pulleys, direct gearing, and clutches. According to an embodiment, the FEAD 210 is structured to transmit power from the WHR system 206 to the accessories of the FEAD 210. In some embodiments, one or more accessories may be powered in other ways, such as by electrical or hydraulic power.

In one embodiment, as illustrated in FIG. 13, the FEAD 210 includes a first accessory 232, a second accessory 284, and a third accessory 285. For example, in one embodiment, the first accessory 232 is a compressor, the second accessory 284 is a water pump, and the third accessory 285 is an alternator or motor-generator unit. The first and second accessories 232, 284 are powered by a belt drive system, including a belt 234. The first and second accessories 232, 284 are operatively coupled to the belt 234 via respective first and second pulleys 286, 287.

The FEAD 210 also includes a clutch 282 structured to selectively couple the first and second accessories 232, 284 of the FEAD 210 to the WHR system 206 (not shown). More specifically, the clutch 282 is selectively coupled to the first gear train 224 of the gearbox 208 (see FIG. 5), which operatively couples the expander 216 of the WHR system 206 (see FIGS. 5 and 12) with the FEAD 210. The clutch 282 includes a clutch pulley 283 structured to operatively couple the clutch 282 to the first and second pulleys 286, 287 of the respective first and second accessories 232, 284 via the belt 234.

In one embodiment, the third accessory 285 is operatively coupled to the WHR system 206 via a second gear train (not shown) of the gearbox 208. For example, the third accessory 285 may include an input shaft with a pinion that engages the second gear train so as to transfer torque from the WHR system 206 to the third accessory 285. In other embodiments, the third accessory 285 is operatively coupled to the belt 234.

In some embodiments, the second pulley 287 is a dual pulley. A second belt (not shown) operatively couples the FEAD 210 with the crankshaft of the engine 202 (not shown). Accordingly, energy may be transferred from the crankshaft of the engine to the FEAD 210 via the second belt. In one embodiment, the third accessory 285 is a motor-generator unit, which may operate to power the components of the FEAD 210 when the engine 202 is not running. The belts and pulleys may comprise a belt drive.

Figure 14:
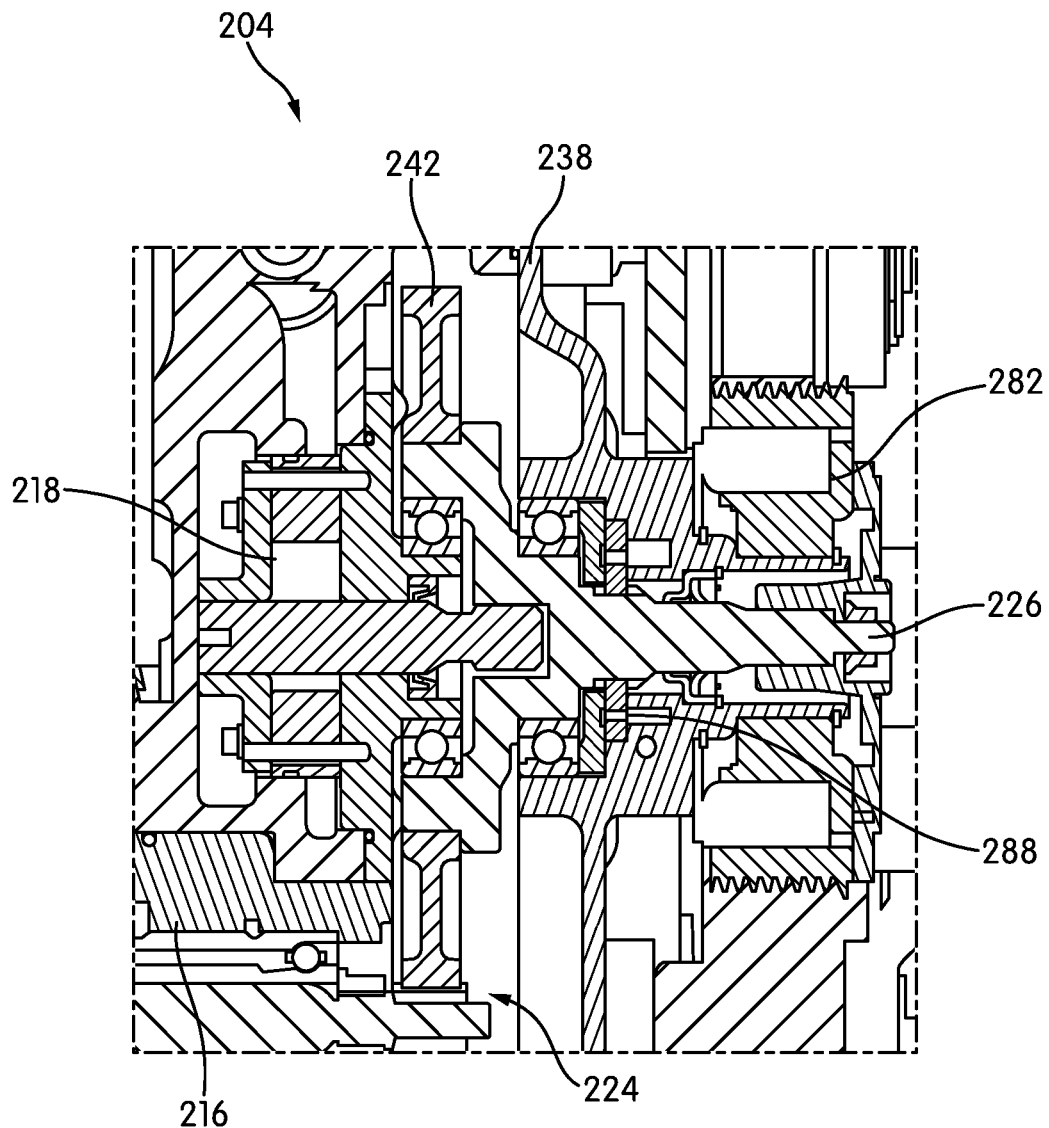
FIG. 14 is a partial cross-sectional view illustration of the WHR power drive system of FIG. 2.

FIG. 14 is a partial cross-sectional view illustration of the WHR power drive system 204 of FIG. 2. The cross-section extends through several components of the WHR power drive system 204, including the feed pump 218 and the expander 216 of the WHR system 206; the first gear train 224, the hub 226, the enclosure cover 238, and the bull gear 242 of the gearbox 208; and the clutch 282 of the FEAD 210. FIG. 14 further illustrates a lube pump 288 of the gearbox 208. The lube pump 288 is operatively coupled to the hub 226 of the gearbox 208. The lube pump 288 is structured to pump a lubricant (e.g., oil) through the gearbox 208. In one embodiment, the lube pump 288 is a gerotor. In some embodiments, the lube pump 288 is structured to pump a lubricant through a bearing of the expander 216. Accordingly, the hub 226 provides integrated operation of each of the feed pump 218, the first gear train 224, and the lube pump 288.

Figure 15A:
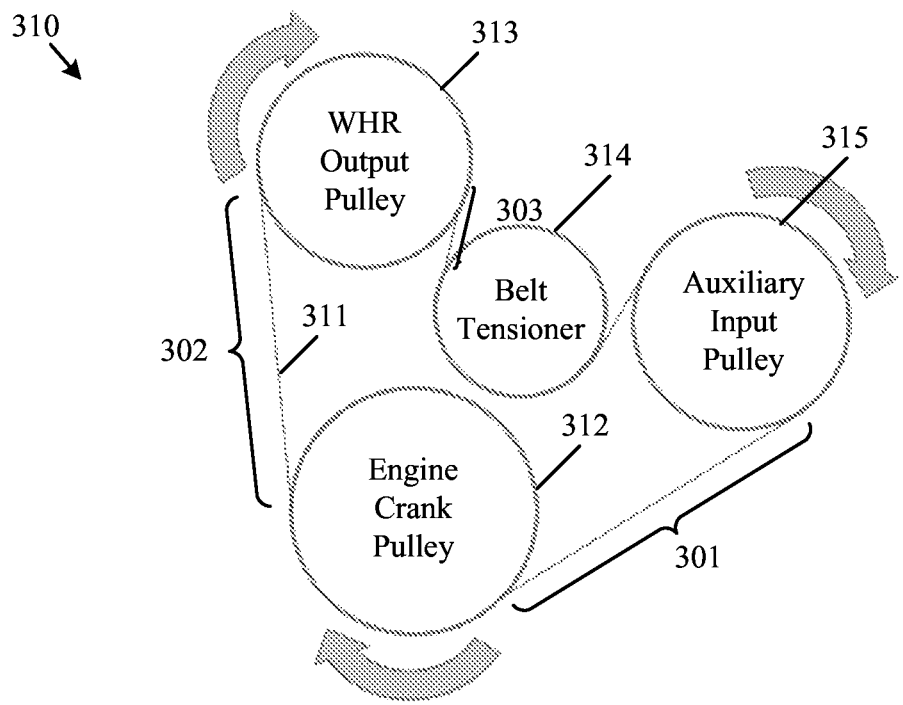
FIGS. 15A and 15B are schematic diagrams of two example arrangements of a belt drive, according to various embodiments.
Figure 15B:
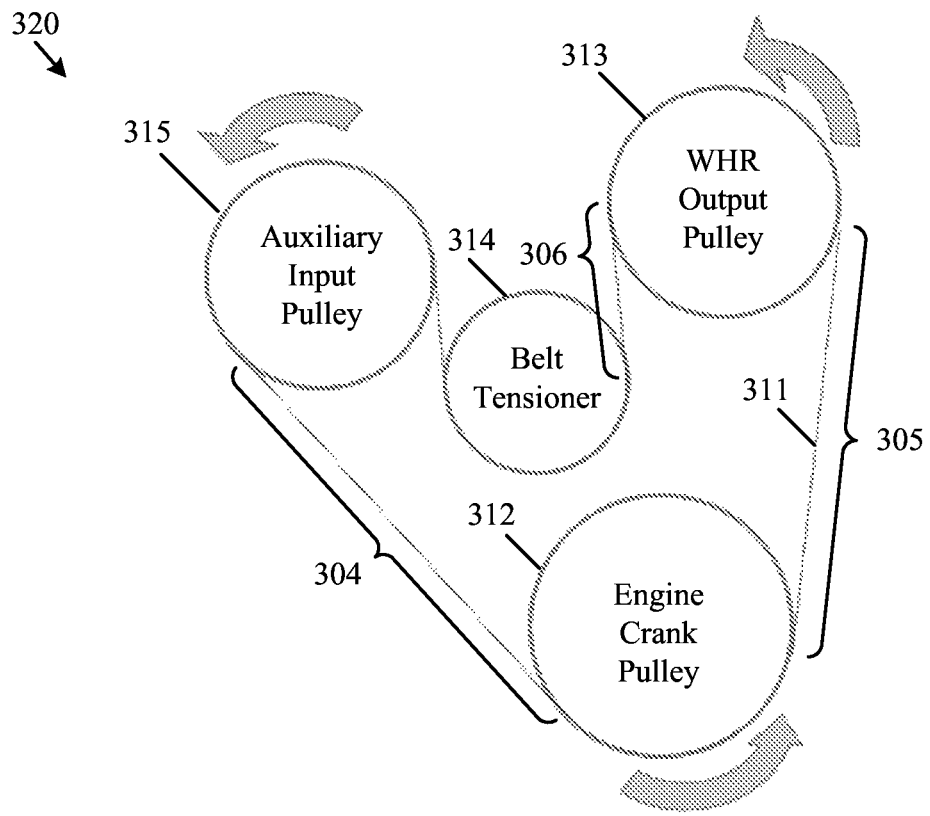

FIGS. 15A and 15B respectively show a first belt drive arrangement 310 and a second belt drive arrangement 320. In various embodiments, the first and second belt drive arrangements 310, 320 are implemented on an engine system, such as the engine system 100 of FIGS. 1A and 1B, or the engine system 200 of FIG. 2. In other embodiments, the first and second belt drive arrangements 310, 320 are implemented on another type of power drive system. For the purposes of clarity and brevity, the first and second belt drive arrangements 310, 320 are described in connection with the engine system 100 of FIG. 1A. However, it should be understood that the first and second belt drive arrangements 310, 320 may be similarly utilized with other systems.

Each of the first belt drive arrangement 310 and the second belt drive arrangement 320 includes an engine crank pulley 312 (e.g., operatively coupled to the crankshaft 136), a WHR output pulley 313 (e.g., the pulley 130), a belt tensioner assembly 314, an auxiliary input pulley 315 (e.g., operatively coupled to an input shaft of the accessory 132), and a belt 311 (e.g., the belt 134). The engine crank pulley 312 is coupled to an end of the crankshaft 136, and as such, power may be translated to and from the engine 102 via the engine crank pulley 312. Similarly, the WHR output pulley 313 is coupled to an end of an output driveshaft of the gearbox 108. The belt tensioner assembly 314 includes a tensioner pulley and an associated pressure application device (e.g., spring-loaded, hydraulic, fixed, etc.) configured to apply a force through the tensioner pulley sufficient to adjust the tension of the belt 311 within specific parameters. The auxiliary input pulley 315 is coupled to an input driveshaft operatively coupled to and providing rotational force to one or more auxiliary devices (e.g., the accessory 132, compressors, pumps, alternators, etc.). The belt 311 is a band (e.g., a serpentine belt, a smooth belt, etc.) that operatively couples the engine crank pulley, the WHR output pulley 313, the auxiliary input pulley 315 and the belt tensioner assembly 314 together.

Each of the first belt drive arrangement 310 and the second belt drive arrangement 320 is a frontal schematic view of an example arrangement of a belt drive. Each of the first belt drive arrangement 310 and the second belt drive arrangement 320 shows the engine crank pulley 312, the WHR output pulley 313, and the auxiliary input pulley 315 disposed in an overall triangular formation. In various arrangements, non-triangular formations are possible, for example through the use of one or more idler pulley routing paths of one or more corresponding belts.

Under a first set of conditions, the rotational output at the engine crank pulley 312 is greater than the rotational output at the WHR output pulley 313. Under a second set of conditions, the rotational output at the WHR output pulley 313 is greater than the rotational output at the engine crank pulley 312.

The belt tensioner assembly 314 is disposed between the WHR output pulley 313 and the auxiliary input pulley 315, with the belt 311 disposed in an alternating manner about each respective pulley. As such, the belt tensioner assembly 314 may apply an inward biasing pressure (e.g., generally toward a middle portion of the triangular formation of the pulleys) to adjust the tension of the belt 311 through the belt span between the WHR output pulley 313 and the auxiliary input pulley 315.

In order of rotational communication via the belt 311 as indicated by the arrows in FIG. 15A, the WHR output pulley 313 is disposed downstream (i.e., rotationally downstream) of the engine crank pulley 312, and the auxiliary input pulley 315 is disposed downstream of the WHR output pulley 313. For example, in operation, the engine crank pulley 312 of the first belt drive arrangement 310 produces a clockwise rotational output in the orientation shown FIG. 15A.

Under the first set of conditions, where the rotational output at the engine crank pulley 312 is greater than the rotational output at the WHR output pulley 313, belt tension is high at a first belt span 301 between the engine crank pulley 312 and the auxiliary input pulley 315 (e.g., due to the engine crank pulley 312 driving the rotation of the upstream auxiliary input pulley 315, and to a lesser extent a drive of the tensioner pulley and the WHR output pulley 313). Belt tensions at a second belt span 302 between the engine crank pulley 312 and the WHR output pulley 313 and a third belt span 303 between the WHR output pulley 313 and the belt tensioner assembly 314 are comparatively lower than the belt tension of the first belt span 301.

Under the second set of conditions, where the rotational output at the WHR output pulley 313 is greater than the rotational output at the engine crank pulley 312, belt tension increases at the second belt span 302 as the WHR output pulley 313 supplements the rotational output of the engine crank pulley 312 and indirectly drives the rotation of the auxiliary input pulley 315. As such, belt tension at the first belt span 301 and the third belt span 303 becomes comparatively lower.

With respect to the second arrangement, as illustrated in FIG. 15B, the engine crank pulley 312 produces a counter-clockwise rotational output in the orientation shown.

Under the first set of conditions, where the rotational output at the engine crank pulley 312 is greater than the rotational output at the WHR output pulley 313, belt tension is high at a fourth belt span 304 between the engine crank pulley 312 and the auxiliary input pulley 315. Correspondingly, belt tensions are comparatively lower at a fifth belt span 305 between the engine crank pulley 312 and the WHR output pulley 313, and at a sixth belt span 306 between the WHR output pulley 313 and the belt tensioner assembly 314.

Under the second set of conditions, where the rotational output at the WHR output pulley 313 is greater than the rotational output at the engine crank pulley 312, belt tension at the fifth belt span 305 increases, while belt tensions at the fourth belt span 304 and the sixth belt span 306 are comparatively low.

In operation, for the implementations illustrated by FIG. 15A and FIG. 15B, the belt tensioner assembly 314 mitigates the changes in belt tension described above, thereby improving the efficiency of the translation of power from the WHR output pulley 313 to the engine crank pulley 312 and damping torsional forces received at the WHR output pulley 313. In the first belt drive arrangement 310, under the first set of conditions, the belt tensioner assembly 314 may be configured to apply pressure to the belt 311 to significantly reduce slack at the second belt span 302. As such, when the first belt drive arrangement 310 transitions from the first set of conditions to the second set of conditions, the amount of energy from the WHR output pulley 313 consumed in increasing the belt tension of the second belt span 302 sufficient to communicate an output to the engine crank pulley 312 is reduced. In addition, reducing the difference in belt tension at the second belt span 302 reduces an operational shock received at the WHR output pulley 313 when transitioning from the first set of conditions to the second set of conditions, such as due to sudden resistance imposed by the engine crank pulley 312 after the WHR output pulley 313 consumes the slack in the belt 311.

Figure 16:
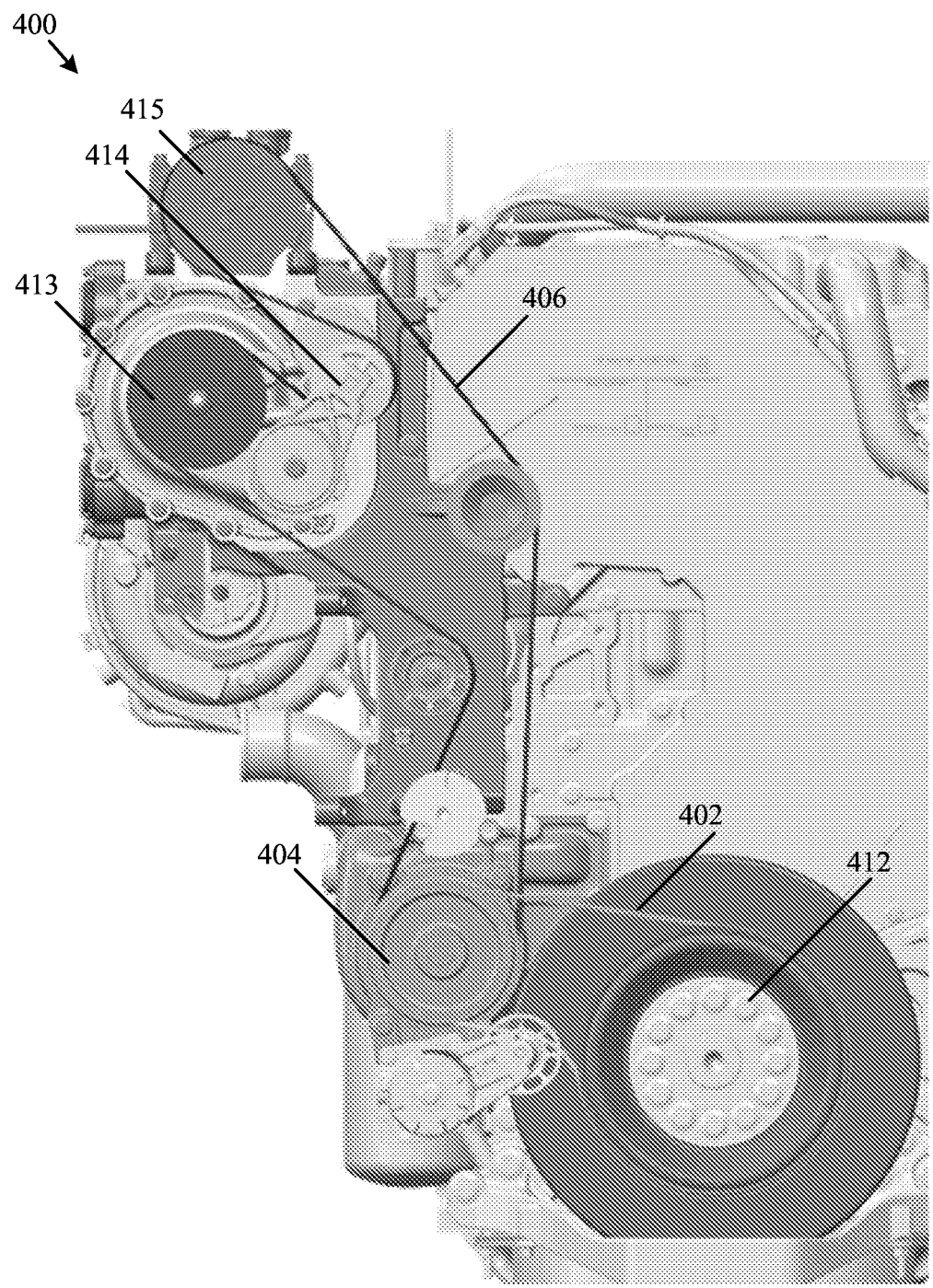
FIG. 16 is a front perspective view illustration of a belt drive system coupled to an engine, according to an embodiment.

Referring now to FIG. 16, an example belt drive system 400 is shown coupled to an engine. The system 400 includes example arrangements of the engine crank pulley 412, the WHR output pulley 413, the belt tensioner assembly 414, and the auxiliary input pulley 415.

In the example of system 400, rather than direct rotational communication between the engine crank pulley 312 and the auxiliary input pulley 315 and the WHR output pulley 313 as shown in FIGS. 15A and 15B, indirect rotational communication is provided by a dual pulley 404. The dual pulley 404 is a rotating device configured to engage two or more belts and communicate rotational forces among the two or more belts. The dual pulley 404 is operatively coupled to a first belt 402 and a second belt 406. The first belt 402 is operatively coupled to the engine crank pulley 412 and the dual pulley 404, and the second belt 406 is operatively coupled to the WHR output pulley 413, the belt tensioner assembly 414, the auxiliary input pulley 415, and the dual pulley 404. Thus, the belt tensioner assembly 414 applies a tensioning pressure at a belt span of the second belt 406 between the WHR output pulley 413 and the auxiliary input pulley 415 in the example of FIG. 16.

Figure 17:
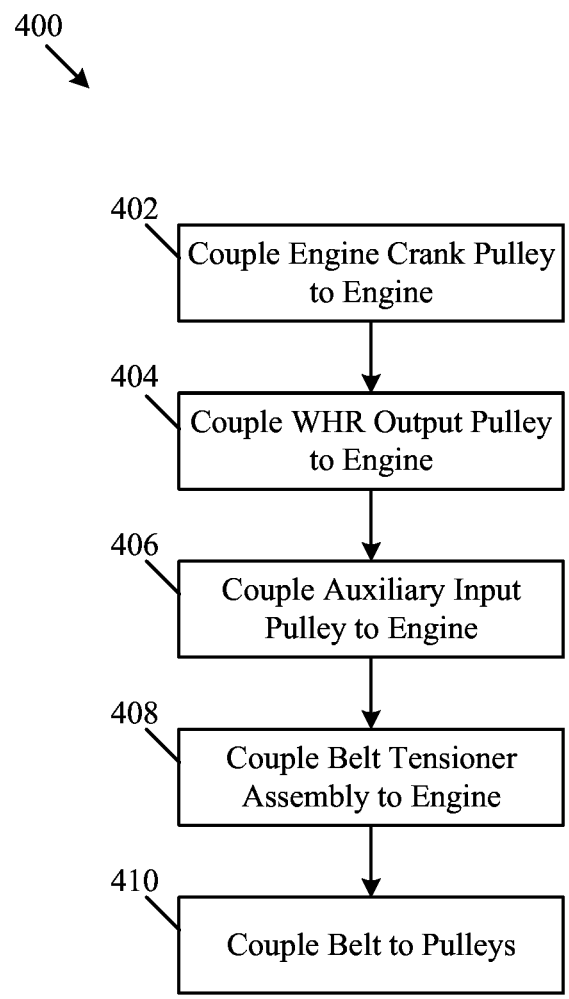
FIG. 17 is a flow diagram illustrating a method of assembling a belt drive, according to an embodiment.

FIG. 17 illustrates a method 500 of manufacturing a belt system. The method 500 is performed using aspects of the engine system 100 of FIG. 1A as well as aspects of the pulley systems described with respect to FIGS. 15A and 15B.

At 502, an engine crank pulley (e.g., the engine crank pulley 312) is coupled to an engine (e.g., the engine 102). The engine crank pulley is operatively coupled to a rotational output component of the engine. For example, the engine crank pulley may be coupled to a driveshaft communicating rotational forces from an associated crankshaft of the engine.

At 504, a WHR output pulley (e.g., the WHR output pulley 313) is coupled to the engine. The WHR output pulley is coupled to a rotational output portion (e.g., a driveshaft) of a WHR system (e.g., the gearbox 108) of the engine.

At 506, an auxiliary input pulley (e.g., the auxiliary input pulley 315) is coupled to the engine. The auxiliary input pulley is coupled to a rotational input receiving component (e.g., a rotational driveshaft) that in turn is operatively coupled to one or more auxiliary devices (e.g., compressors, pumps, etc.) associated with the engine or the vehicle in which the engine is disposed. The one or more auxiliary devices operate in part due to the rotational input provided through the auxiliary input pulley. The auxiliary input pulley is coupled at a downstream position relative to the WHR output pulley, based on the rotation direction of the engine crank pulley.

At 508, a belt tensioner assembly (e.g., the belt tensioner assembly 314) is coupled to the engine. The belt tensioner assembly is coupled to the engine at a location that enables the belt tensioner assembly to apply pressure to a belt span between the WHR output pulley and the auxiliary input pulley.

At 510, one or more belts (e.g., the belt 311, or the belts 402, 406 of FIG. 16) are coupled to the pulleys. The one or more belts communicatively couple the engine crank pulley, the WHR output pulley, and the auxiliary input pulley together, thereby allowing for communication of rotational forces among the pulleys. At least one belt is operatively coupled to the belt tensioner assembly to allow the tensioner assembly to adjust belt tension along at least a portion of a belt span between the WHR output pulley and the engine crank pulley.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

It should be understood by those of skill in the art who review this disclosure that various features are described and claimed without restricting the scope of these features to the precise numerical ranges provided unless otherwise noted. Accordingly, insubstantial or inconsequential modifications or alterations of the subject matter described and claimed are considered to be within the scope of the invention as recited in the appended claims.

The terms "coupled" and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. When the language "at least a portion" and/or "a portion" is used the item can include a portion and/or the entire item unless specifically stated to the contrary.

What is claimed is:

1. A waste heat recovery power drive system, comprising:
    a waste heat recovery system, comprising:
        a heat exchanger operatively coupled to an engine so as to receive heat energy from the engine and transfer the heat energy to a working fluid; and
        an expander fluidly coupled to the heat exchanger so as to receive the working fluid from the heat exchanger, the expander structured to convert heat energy from the working fluid to mechanical energy;
    a gearbox operatively coupled to the expander;
    a front engine accessory drive comprising a belt drive operatively coupling the gearbox to a crankshaft of the engine so as to transfer the mechanical energy from the gearbox to the crankshaft of the engine; and
    a unitary assembly comprising the front engine accessory drive, the gearbox, and the expander, the unitary assembly being removable from the engine as a unitary component;
    wherein the gearbox further operatively couples the expander to a first input shaft of an alternator, and wherein the belt drive further operatively couples a second input shaft of the alternator to the crankshaft of the engine.

2. The system of claim 1, wherein the waste heat recovery system further includes a feed pump operatively coupled to the expander, the feed pump structured to circulate the working fluid through a working fluid circuit comprising the heat exchanger and the expander.

3. The system of claim 2, the unitary assembly further comprising the feed pump.

4. The system of claim 2, wherein the waste heat recovery system further includes a working fluid control system structured to control flow of the working fluid through the working fluid circuit.

5. The system of claim 4, wherein the working fluid control system includes a flow control valve positioned along the working fluid circuit, the flow control valve structured to control flow of the working fluid flowing through the working fluid circuit to the heat exchanger.

6. The system of claim 4, wherein the working fluid control system further includes a bypass valve positioned along the working fluid circuit downstream of the feed pump, the bypass valve structured to selectively direct the working fluid from the working fluid circuit upstream of the heat exchanger to the working fluid circuit downstream of the expander so as to bypass each of the heat exchanger and the expander.

7. The system of claim 2, wherein the gearbox defines a cooling passage, the cooling passage fluidly coupled to the working fluid circuit and structured to receive the working fluid from the working fluid circuit so as to cool each of the gearbox, and components and fluids in the gearbox.

8. The system of claim 1, wherein the gearbox comprises:
a hub operatively coupled to the expander via a first gear train,
wherein an output shaft of the expander is disposed at a vertically lower position on the gearbox relative to a central axis of the hub.

9. The system of claim 1, wherein the gearbox further operatively couples the expander to a lubrication pump.

10. The system of claim 1, wherein the belt drive further includes: a dual pulley;
a first belt operatively coupling the dual pulley to the gearbox;
a second belt operatively coupling the dual pulley to the crankshaft of the engine.

11. The system of claim 10, wherein the second belt further operatively couples a second input shaft of the alternator to the crankshaft of the engine.

12. The system of claim 10, further comprising a clutch selectively coupling a first gear train of the gearbox to a clutch pulley, wherein the first belt is operatively coupled to the gearbox via the clutch pulley.

13. The system of claim 12, wherein the gearbox further comprises:
a gearbox enclosure, the first gear train positioned within the gearbox enclosure;
a hub positioned partially within the gearbox enclosure, the hub comprising a hub shaft extending through the gearbox enclosure, the clutch pulley operatively coupled to the shaft and positioned outside of the enclosure; and
a seal operatively coupled to the shaft, the seal structured to prevent fluids from exiting the gearbox enclosure and to prevent atmospheric elements and debris from entering the gearbox enclosure.

14. The system of claim 1, wherein the belt drive comprises:
an engine crank pulley operatively coupled to the crankshaft of the engine;
a waste heat recovery output pulley operatively coupled to an output shaft of the gearbox;
an auxiliary input pulley operatively coupled to an input shaft of an auxiliary device;
a belt tensioner pulley operatively coupled to a belt tensioner; and
a first belt rotatably coupling each of the engine crank pulley, the waste heat recovery output pulley, the auxiliary input pulley, and the belt tensioner,
wherein the waste heat recovery output pulley is positioned rotationally downstream of the engine crank pulley relative to a rotational direction of the first belt.

15. The system of claim 14, wherein the belt tensioner pulley is positioned in a slack span of the first belt when the waste heat recovery system produces power and when the auxiliary device consumes power.

16. The system of claim 14, wherein the belt tensioner pulley is positioned rotationally downstream of each of the engine crank pulley and the waste heat recovery output pulley relative to the rotational direction of the first belt.

17. A waste heat recovery power drive system, comprising: a waste heat recovery system, comprising:
a heat exchanger operatively coupled to an engine so as to receive heat energy from the engine and transfer the heat energy to a working fluid; and
an expander fluidly coupled to the heat exchanger so as to receive-the working fluid from the heat exchanger, the expander structured to convert heat energy from the working fluid to mechanical energy;
a gearbox operatively coupled to the expander;
a front engine accessory drive comprising an input gear in meshed engagement with an output gear of the gearbox to operatively couple the gearbox to a crankshaft of the engine so as to transfer the mechanical energy from the gearbox to the crankshaft of the engine; and
a unitary assembly comprising the front engine accessory drive, the gearbox, and the expander, the unitary assembly being removable from the engine as a unitary component;
wherein the input gear is disposed at a vertically lower position on the gearbox relative to the output gear so as to reduce aerodynamic losses.

18. A waste heat recovery power drive system, comprising:
a waste heat recovery system, comprising:
a heat exchanger operatively coupled to an engine so as to receive heat energy from the engine and transfer the heat energy to a working fluid; and
an expander fluidly coupled to the heat exchanger so as to receive the working fluid from the heat exchanger, the expander structured to convert heat energy from the working fluid to mechanical energy;
a gearbox operatively coupled to the expander;
a front engine accessory drive comprising a belt drive operatively coupling the gearbox to a crankshaft of the engine so as to transfer the mechanical energy from the gearbox to the crankshaft of the engine; and
a unitary assembly comprising the front engine accessory drive, the gearbox, and the expander, the unitary assembly being removable from the engine as a unitary component;
wherein the gearbox further operatively couples the expander to a first input shaft of an alternator, and wherein the belt drive further includes:
a first belt operatively coupling a pulley to the gearbox; and
a second belt operatively coupling the pulley to the crankshaft of the engine.

19. A waste heat recovery power drive system, comprising:
a waste heat recovery system, comprising:

a heat exchanger operatively coupled to an engine so as to receive heat energy from the engine and transfer the heat energy to a working fluid; and an expander fluidly coupled to the heat exchanger so as to receive the working fluid from the heat exchanger, the expander structured to convert heat energy from the working fluid to mechanical energy;

a gearbox operatively coupled to the expander;

a front engine accessory drive comprising a belt drive operatively coupling the gearbox to a crankshaft of the engine so as to transfer the mechanical energy from the gearbox to the crankshaft of the engine; and a unitary assembly comprising the front engine accessory drive, the gearbox, and the expander, the unitary assembly being removable from the engine as a unitary component;

wherein the belt drive comprises:

an engine crank pulley operatively coupled to the crankshaft of the engine;

a waste heat recovery output pulley operatively coupled to an output shaft of the gearbox;

an auxiliary input pulley operatively coupled to an input shaft of an auxiliary device;

a belt tensioner pulley operatively coupled to a belt tensioner; and a belt rotatably coupling each of the engine crank pulley, the waste heat recovery output pulley, the auxiliary input pulley, and the belt tensioner, wherein the waste heat recovery output pulley is positioned rotationally downstream of the engine crank pulley relative to a rotational direction of the belt, wherein the belt tensioner pulley is positioned in a slack span of the belt.

* * * * *